(12) United States Patent
Suzuki et al.

(10) Patent No.: US 7,759,421 B2
(45) Date of Patent: Jul. 20, 2010

(54) HEAT-STABLE SOFT RESINOUS SHEET ARTICLES AND COMPOSITIONS THEREFOR

(75) Inventors: Takuo Suzuki, Ashikaga (JP); Mamoru Ubukata, Tatebayashi (JP)

(73) Assignee: Achilles Corporation, Tokyo (JP)

( * ) Notice: Subject to any disclaimer, the term of this patent is extended or adjusted under 35 U.S.C. 154(b) by 705 days.

(21) Appl. No.: 10/588,727

(22) PCT Filed: Apr. 21, 2004

(86) PCT No.: PCT/JP2004/005684

§ 371 (c)(1),
(2), (4) Date: Aug. 8, 2006

(87) PCT Pub. No.: WO2004/101677

PCT Pub. Date: Nov. 25, 2004

(65) Prior Publication Data

US 2008/0146711 A1    Jun. 19, 2008

(51) Int. Cl.
*C08F 220/06* (2006.01)
*C08F 220/10* (2006.01)
*C08K 3/22* (2006.01)

(52) U.S. Cl. .................. 524/556; 524/436; 524/437; 428/500

(58) Field of Classification Search ............ 524/417, 524/425, 436, 437, 556; 428/500
See application file for complete search history.

(56) References Cited

U.S. PATENT DOCUMENTS

| | | | | |
|---|---|---|---|---|
| 4,009,137 | A * | 2/1977 | Dany et al. | 523/179 |
| 4,081,414 | A * | 3/1978 | Abe et al. | 524/273 |
| 4,478,963 | A * | 10/1984 | McGarry | 523/205 |
| 4,529,787 | A | 7/1985 | Schmidt et al. | |
| 4,546,160 | A | 10/1985 | Brand et al. | |
| 4,698,379 | A * | 10/1987 | Nakaya et al. | 523/513 |
| 5,202,382 | A * | 4/1993 | Pettit, Jr. | 525/108 |
| 6,783,850 | B2 * | 8/2004 | Takizawa et al. | 428/355 AC |
| 7,351,782 | B2 * | 4/2008 | Wakabayashi et al. | 528/18 |

FOREIGN PATENT DOCUMENTS

| | | |
|---|---|---|
| JP | A 59-6207 | 1/1984 |
| JP | A 60-215007 | 10/1985 |
| JP | A 3-149271 | 6/1991 |
| JP | A 5-171103 | 7/1993 |
| JP | A 8-311390 | 11/1996 |
| JP | A 9-296144 | 11/1997 |
| JP | A 10-17640 | 1/1998 |
| JP | A 10-88062 | 4/1998 |
| JP | A 2000-128911 | 5/2000 |
| JP | A 2000-239308 | 9/2000 |
| JP | A 2001-40037 | 2/2001 |
| JP | A 2003-327845 | 11/2003 |
| JP | 2004010735 A * | 1/2004 |
| WO | WO 90/05168 A1 | 5/1990 |
| WO | WO2004031299 * | 4/2004 |

OTHER PUBLICATIONS

JP 10-088062 to Takamasa et al., Jul. 4, 1998, Machine translation.*
JP 2004010735A, Jan. 2004, Nishioka et al., machine translation.*
Lee et al. ("The Glass Transition Temperatures of Polymers", Polymer Handbook, 2nd ed., Brandrup et al. ed., John Wiley & Sons, New York, pp. 139-142 (1975).*
Wypych, George (Handbook of Fillers, Chem Tech Publishing, Apr. 21, 2001, pp. 23, 24, 106).*

* cited by examiner

*Primary Examiner*—Satya B Sastri
(74) *Attorney, Agent, or Firm*—Oliff & Berridge, PLC

(57) ABSTRACT

A soft resinous sheet article having both flexibility and heat-stable, is prepared from a composition containing a matrix and a filler (C) comprising at least one of a metal carbonate and a metal hydroxide, having an average particle diameter of 0.5 to 30 μm and showing a decomposition temperature of 250° C. or higher, the matrix containing an acrylic copolymer (A) containing at least one carboxyl group as a functional group and having a molecular weight of 800 to 20000 and an acid value (AV) of 20 to 150; and a compound (B) containing two or more glycidyl groups in its molecule and having a weight per epoxide of 80 to 400. This article is used to for example thermal interface materials, thermal conductive sheet, thermally conductive polymer, heat conductive sheet, heat dissipative sheet and heat transfer material.

6 Claims, No Drawings

HEAT-STABLE SOFT RESINOUS SHEET ARTICLES AND COMPOSITIONS THEREFOR

TECHNICAL FIELD

The present invention relates to compositions for forming soft resinous sheet articles having both flexibility and appropriate heat resistance. The compositions of the present invention can be subjected to processing such as casting or coating. The sheet articles are usable in a wide variety of parts that must have heat resistance such as thermal interface materials, conductive insulations or thermal insulations.

BACKGROUND ART

As the resin which yields a material having flexibility, thermoplastic resins such as soft polyvinyl chlorides, polyethylenes and polypropylenes have been conventionally used. However, these thermoplastic resins have insufficient heat resistance and, especially, are not suitable for use at high temperatures over a long period of time.

As heat-stable materials having flexibility, vulcanized rubbers are widely employed. However, the vulcanized rubber needs vulcanization steps after shaped by molding, calendaring or extruding.

Vulcanization requires a complicated control of the reactions to keep sufficient softness and to constitute a three-dimensional crosslinking structure. The reactions must be controlled by combining various vulcanizations-accelerators and scorch retarders. In addition, the vulcanization process must be performed at high temperatures and requires a long period of time.

On the other hand, some of silicone rubbers are cured or vulcanized at ambient temperature (RTV silicone rubbers), in which two components which are liquid at room temperature are mixed in a specific ratio to thereby cure the component rubbers. The cured articles of RTV silicone rubbers have excellent heat resistance (Japanese Patent Application Laid-open No. Hei 9-296144). However, silicone resins including silicone rubbers are expensive, and silicone rubbers have insufficient adherence to other substances and cannot significantly be adhered to other adherends unless a special adhesive is used. In addition, low-molecular-weight siloxane molecules contained in silicone rubbers evaporate with an elevating temperature and precipitate to the articles such as electrode of the electric circuits, thus causing contact failures and short circuits.

DISCLOSURE OF INVENTION

Accordingly, an object of the present invention is to solve the above problems and to provide a sheet article having flexibility and better heat-stability by curing a composition.

More specifically, the object of the present invention is to provide a composition which is liquid at room temperature, can be easily cured by heating in a short time without controlling complicated reactions, in contrast to the vulcanization process, and can yield a sheet article that is stable at relatively high temperatures over a long period of time.

The present inventors made intensive investigations on compositions mainly comprising an acrylic copolymer to provide heat-stable soft resinous sheet articles which avoid the above problems and are inexpensive in contrast to silicone resins. As a result, they have found a composition containing a matrix including an acrylic copolymer being substantially free of solvent or medium and having specific physical properties, and a compound containing glycidyl groups and having specific physical properties as a curing agent being substantially free of solvent or medium. More specifically, they have found that the composition can contain an inorganic filler in a relatively high amount of 10 percent by volume to 80 percent by volume to the matrix, and that soft resinous sheet articles showing satisfactory adherence to other materials and having good heat resistance, satisfactory flame retardancy and sufficient flexibility can be efficiently produced by curing, preferably by heating, the composition.

Specifically, the present invention relates to a resin composition for forming a heat-stable soft resinous sheet article, containing a matrix and a filler (C) comprising at least one of a metal carbonate and a metal hydroxide, having an average particle diameter of 0.5 to 30 µm and showing a decomposition temperature of 250° C. or higher, the matrix containing an acrylic copolymer (A) containing a carboxyl group as a functional group and having a molecular weight of 800 to 20000 and an acid value (AV) of 20 to 150; and a compound (B) containing two or more glycidyl groups in its molecule and having a weight per epoxide (WPE) of 80 to 400.

In addition and advantageously, the present invention relates to a heat-stable soft resinous sheet article prepared by simply mixing and stirring the component (A) and the component (B) in the composition to thereby cure these components without special processes.

BEST MODE FOR CARRYING OUT THE INVENTION

The "acrylic copolymer" as the component (A) used herein means and includes acrylic copolymers prepared by copolymerization of two or more different monomers, as well as blends of two or more different acrylic homopolymers, blends of two or more of acrylic homopolymers and acrylic copolymers, and blends of two or more different acrylic copolymers.

In the acrylic copolymer (A), at least a major constitutional polymer preferably has a glass transition temperature (Tg) of −60° C. to −20° C. as determined by differential scanning calorimetry, and all the constitutional polymers may have a glass transition temperature (Tg) of −60° C. to −20° C. If the major constitutional polymer of acrylic copolymer (A) has an excessively high glass transition temperature (Tg), the composition may become excessively hard and be difficult to handle in procedures such as compounding. If it has an excessively low glass transition temperature Tg, the cured article may have an insufficient hardness.

The molecular weight of the acrylic copolymer (A) is a number-average molecular weight in terms of polystyrene determined by gel permeation chromatography (GPC) and should be from 800 to 20000 and is preferably from 2000 to 15000.

An acrylic copolymer having a molecular weight less than 800 often contains very-low-molecular-weight fractions (monomers, dimers, trimers and other oligomers), and such fractions invite voids during curing and bleedout after curing. In contrast, an acrylic copolymer having a molecular weight exceeding 20000 has deteriorated flowability, is difficult to mix with an appropriate amount of the filer and is deteriorated in workability.

The acid value (AV) of the acrylic copolymer (A) as an index of the proportion of carboxyl groups (—COOH) should be from 20 to 150 and is preferably from 50 to 150 as determined by potassium hydroxide (KOH) titration.

An acrylic copolymer having an acid value less than 20 may not provide a sufficient amount of crosslinks and may fail to provide a cured article having sufficient heat resistance. An acrylic copolymer having an acid value exceeding 150 may have excessively dense crosslinks to thereby form a cured article having insufficient flexibility.

The acrylic copolymer (A) preferably has a viscosity of 90000 mPa·s or less at 25° C. at 1013 hPa. An acrylic copolymer having a viscosity exceeding 90000 mPa·s may have deteriorated flowability, be difficult to mix with an appropriate amount of the filler and be deteriorated in workability.

To avoid the formation of voids in the cured article, the acrylic copolymer (A) should preferably react with the other components substantially in the absence of solvent.

The "viscosity" as used herein means a viscosity measured with a Brookfield rotational viscometer (Model BM). When the acrylic copolymer flows thixotropically, it may have a viscosity of 90000 mPa·s or less at an increasing shear rate. If it flows in a dilatant manner, it may have a viscosity of 90000 mPa·s or less even at a very low shear rate.

The glycidyl-containing compound (B) serves as a curing agent that reacts with a carboxyl group of the acrylic copolymer (A) to form a cured article and should have at least two glycidyl groups in its molecule and have a weight per epoxide (WPE) of 80 to 400.

A compound having a weight per epoxide (WPE) less than 80 must be added in a large amount to react with acrylic copolymer (A), and the resulting sheet article may not satisfy the requirements. In contrast, a compound having a weight per epoxide (WPE) exceeding 400 may invite an excessively high reaction rate to fail to produce a satisfactory sheet article.

Preferably, the compound (B) is liquid at 25° C. at 1013 hPa, shows a weight loss after heating at 150° C. for 10 minutes under normal pressure (1013 hPa) of less than 3 percent based on the weight before heating and is substantially free of solvent or medium.

The "weight loss on heating" used herein is determined by heating five grams of a sample at 150° C. at normal atmospheric pressure (1013 hPa) for 10 minutes, measuring the weight of the sample after heating with a Halogen Moisture Meter Model EG53 (trade name, a product of Mettler Toledo International Inc.) and calculating a percentage weight loss from the weights of the sample before and after heating.

The compound (B) having glycidyl groups preferably has a weight loss after heating at 150° C. at 1013 hPa for 10 minutes of less than 3 percent based on the weight before heating. If the weight loss exceeds 3 percent, the chain elongation as a result of the reaction with the compound having a carboxyl group may be inhibited, and bubbles (foams) may form in the resulting sheet articles such as sheets. The compound (B) is preferably substantially free of solvent or medium, because the presence of such a solvent causes a weight loss.

The filler (C) for use in the present invention comprises at least one of metal carbonates and metal hydroxides each having a decomposition temperature of 250° C. or higher. A filler having a decomposition temperature lower than 250° C. does not sufficiently function to increase heat resistance.

The decomposition temperature can be determined in the following manner. The weight of a sample filer alone is continuously measured by Thermo Gravimetric Analyzer in a normal air environment while raising the temperature from room temperature to 600° C. at a rate of 10° C./min, and a temperature at which weight loss of the sample occurs is determined. The decomposition temperature is defined as the temperature at which weight loss occurs.

A feature of the acrylic copolymer (A) for use in the present invention is having at least one carboxyl group in its molecule. The carboxyl group can be introduced, for example, by copolymerizing an acrylic monomer as a major component having no functional group with a copolymerizable vinyl monomer and a carboxyl-containing monomer together. Alternatively, the carboxyl group can be introduced by copolymerizing an acrylic monomer with a copolymerizable monomer, and subjecting the product to end-terminal reaction with a carboxyl-containing molecule.

The acrylic copolymer (A) can have such carboxyl functional group(s) at any position in its molecule, i.e., at molecular terminal(s) and/or inside the molecular chain or blanched chain. It can be a random copolymer or block copolymer. It does not necessarily have a uniform structure and can be a blend of acrylic copolymers having different constitutional repeating units.

Examples of the acrylic monomer having no functional group and working as the major component of the acrylic copolymer (A) are alkyl esters of acrylic acid, alicyclic esters of acrylic acid, alkyl esters of methacrylic acid and alicyclic esters of methacrylic acid.

Examples of the alkyl esters of acrylic acid are methyl acrylate, ethyl acrylate, propyl acrylate, isopropyl acrylate, n-butyl acrylate, isobutyl acrylate, tert-butyl acrylate, 2-ethylhexyl acrylate, octyl acrylate, isooctyl acrylate, decyl acrylate, isodecyl acrylate, isononyl acrylate, neopentyl acrylate, tridecyl acrylate and lauryl acrylate.

Examples of the alicyclic esters of acrylic acid are cyclohexyl acrylate, isobornyl acrylate, tricyclodecyl acrylate and tetrahydrofurfuryl acrylate.

Examples of the alkyl esters of methacrylic acid are methyl methacrylate, ethyl methacrylate, propyl methacrylate, isopropyl methacrylate, n-butyl methacrylate, isobutyl methacrylate, tert-butyl methacrylate, 2-ethylhexyl methacrylate, octyl methacrylate, isooctyl methacrylate, decyl methacrylate, isodecyl methacrylate, isononyl methacrylate, neopentyl methacrylate, tridecyl methacrylate and lauryl methacrylate.

Examples of the alicyclic esters of methacrylic acid are cyclohexyl methacrylate, isobornyl methacrylate, tricyclodecyl methacrylate and tetrahydrofurfuryl methacrylate.

Among them, alkyl esters of acrylic acid and alkyl esters of methacrylic acid are preferred, of which n-butyl acrylate and 2-ethylhexyl acrylate are more preferred.

Examples of monomers which are copolymerizable with these acrylic monomers are vinyl monomers such as acrylonitrile, acrylamide, methacrylamide, N-dimethylacrylamide, N-dimethylmethacrylamide, N-dimethylaminoethyl acrylate, N-dimethylaminoethyl methacrylate, N-diethylaminoethyl acrylate, N-diethylaminoethyl methacrylate, vinyl acetate, styrene, α-methylstyrene, divinylbenzenes, and allyl (meth)acrylate.

Examples of copolymerizable monomers having at least one carboxyl group as a functional group are acrylic acid, methacrylic acid, itaconic acid, crotonic acid, isocrotonic acid, maleic acid, fumaric acid, citraconic acid, mesaconic acid, and functional monomers derived from these monomers. Each of these monomers can be used alone or in combination.

The compound (B) having glycidyl groups and serving as a curing agent can be any of various compounds but is preferably liquid at room temperature (ordinary temperature). The compound (B) is preferably substantially free of diluent such as solvent, for avoiding bubbles or foams in the resulting sheet article.

The compound (B) must have at least two glycidyl groups in its molecule. Examples of such compounds are sorbitol polyglycidyl ether (SORPGE), polyglycerol polyglycidyl ether (PGPGE), pentaerythritol polyglycidyl ether (PETPGE), diglycerol polyglycidyl ether (DGPGE), glycerol polyglycidyl ether (GREPGE), trimethylolpropane polyglycidyl ether (TMPPGE), resorcinol diglycidyl ether (RES-DGE), neopentyl glycol diglycidyl ether (NPGDGE), 1,6-hexanediol diglycidyl ether (HDDGE), ethylene glycol diglycidyl ether (EGDGE), polyethylene glycol diglycidyl ether (PEGDGE), propylene glycol diglycidyl ether (PGDGE), polypropylene glycol diglycidyl ether (PPGDGE), polybutadiene diglycidyl ether (PBDGE), phthalic acid diglycidyl ether (DGEP), halogenated neopentyl glycerol diglycidyl ether, diglycidyl ether of bisphenol A (DGEBA) and diglycidyl ether of bisphenol F (DGEBF). Among them, trimethylolpropane polyglycidyl ether (TMPPGE) and sorbitol polyglycidyl ether (SORPGE) are preferred.

The composition of the present invention may further comprise, in the matrix, an aliphatic hydrocarbon compound (D) containing one or more carboxyl groups (—COOH) and one or more hydroxyl groups as functional groups and having a molecular weight of 70 to 300 and a melting point of 70° C. or lower, in addition to the components (A) and (B). The acid value (AV) of the aliphatic hydrocarbon compound (D) as an index of the proportion of carboxyl functional groups is preferably from 20 to 150 and more preferably from 50 to 150 as determined by KOH titration.

The weight ratio of the component (D) to the component (A) is preferably from 1:99 to 45:55. If the weight ratio of the component (D) is excessively small, the advantages of the component (D) may not be sufficiently obtained. If it is excessively high, the cured article may have an insufficient hardness.

The preferred ranges of the molecular weight, acid value and ratio to the component (A) of the aliphatic hydrocarbon compound (D) are specified for sufficiently mixing with the other components at a reaction temperature so as to react with the glycidyl-containing compound (B) efficiently with the acrylic copolymer (A) and for imparting an appropriate viscosity to the composition so as to disperse the filler (C) homogeneously.

Examples of the aliphatic hydrocarbon compound (D) are aliphatic alpha-hydroxy acids, beta-hydroxy acids and gamma-hydroxy acids such as lactic acid, hydracrylic acid, alpha-hydroxybutyric acid, glyceric acid, hydroxycaprylic acid, hydroxycapric acid and ricinolic acid.

The amount of the glycidyl-containing compound (B) in terms of glycidyl equivalent is preferably from 80 to 150 relative to 100 acid equivalents of the acrylic copolymer (A) and the total of the acrylic copolymer (A) and the aliphatic hydrocarbon compound (D).

If the amount of the glycidyl-containing compound (B) in terms of glycidyl equivalents is less than 80, curing does not proceed sufficiently and the resulting product may not be cured completely, thus inviting deteriorated resistance to creep at high temperatures. If it exceeds 150, the sheet article may have an excess residual compound having glycidyl groups, thus inviting bleedout with time.

The filler (C) is at least one of metal carbonates and metal hydroxides each having a decomposition temperature of 250° C. or higher. Examples of the metal carbonates are calcium carbonate, barium carbonate and sodium carbonate. Examples of the metal hydroxides are aluminium tri-hydroxide and barium hydroxide. Each of these fillers can be used alone or in combinations.

The dimensions and shape of the filler (C) are not specifically limited. The filler (C) preferably has an average particle diameter of about 0.5 to about 30 μm and is spherical or substantially spherical.

A filler having an average particle diameter less than 0.5 μm may invite an excessively high viscosity of the composition comprising the filler and the matrix resins. In contrast, a filler having an average particle diameter exceeding 30 μm may be difficult to mix with the matrix resins and may be hardly uniformly dispersed in the resulting sheet article.

The filler (C) is preferably free of water. If it has water absorbency, it is preferably heated and dried before mixing with the other components.

Plural fillers having the same or different compositions having different average particle diameters can be used in combination. In the case where the amount of the filler must be increased, plural fillers having different average particle diameters are preferably used in combination to thereby reduce the viscosity of the composition.

In addition to the above fillers, the composition may further comprise any of heat-stable organic compounds such as powdery crosslinked melamine resins and melamine benzoguanidine resins as a filler.

The amount of the filler (C) is appropriately set so as to yield desired properties, is not specifically limited but is preferably from 10 percent by volume to 80 percent by volume to 100 of the total volume of the filler (C) and the matrix resin. The matrix resin herein is the total of the acrylic copolymer (A), the glycidyl-containing compound (B) and, if any, the aliphatic hydrocarbon compound (D).

If the amount of the filler (C) is less than 10 percent by volume, the composition may not be sufficiently stable to heat. If it exceeds 80 percent by volume, the sheet article as a cured article may not be sufficiently flexible and be difficult to handle in some applications.

The composition can obtain a sheet article by mixing, stirring and curing the acrylic copolymer (A), the glycidyl-containing compound (B) and, where necessary, the aliphatic hydrocarbon compound (D). The composition preferably further comprises a reactive catalytic component (E). The reactive catalytic component (E) is not specifically limited, and suitable examples are quaternary ammonium salts, tertiary amines, cyclic amines such as imidazole compounds and diazabicycloundecene (DBU), salts of cyclic amines, phosphorus compounds and Lewis acids.

Examples of the quaternary ammonium salts are triethylbenzylammonium chloride (TEBAC), tetrabutylammonium chloride (TABC) and tetramethylammonium chloride (TMAC).

Examples of the tertiary amines are triethylenediamine (TEDA) and benzyldimethylamine.

Examples of the imidazole compounds are 1,2-dimethylimidazole (1,2-DMZ), 1-benzyl-2-methylimidazole (1B2MZ), 2-ethyl-4-methylimidazole (2E4MZ) and 2-cianoethyl-2-ethyl-4-methylimidazole (2E4MZ-CN).

Examples of diazabicycloundecene and salts thereof are 1,8-diaza-bicyclo[5.4.0]-7-undecene (DBU) and alkanoic acid salts thereof.

Examples of the phosphorus compounds are triphenylphosphine and tetrabutylphosphonium bromide.

Examples of the Lewis acids are aluminium chloride, aluminium bromide, titanium tetrachloride, tin tetrachloride and boron trifluoride, of which monoethylamine and ethanolamine compounds of boron trifluoride are preferred.

Among these catalysts, tertiary amines and imidazole compounds are preferably used for their reactivity, of which 2-ethyl-4-methylimidazole (2E4MZ) is typically preferred. It is speculated that the imidazole compounds accelerate the reaction between glycidyl groups in the glycidyl-containing compound (B) and the carboxyl groups (—COOH) in the acrylic copolymer (A) and, or the mixture of the acrylic copolymer (A), the aliphatic hydrocarbon compound (D), undergo chain reaction with excess glycidyl groups and thereby prevent physical properties from deteriorating due to the unreacted glycidyl-containing compound (B). However, a detailed mechanism thereof has not been clarified.

The amount of the catalyst (E) is preferably from 0.01 to 10 parts by weight and more preferably from 0.5 to 3 parts by weight to 100 parts by weight of the acrylic copolymer (A) and the total of the acrylic copolymer (A) and the aliphatic hydrocarbon compound (D).

It is preferable to previously add the catalyst (E) to the acrylic copolymer (A) or the mixture of the acrylic copolymer (A) and the aliphatic hydrocarbon compound (D), and then to mix the glycidyl-containing compound (B) therewith.

The composition may further comprise any of additives such as pigments and other colorants, antioxidants, flame retardants, weathering stabilizers and heat stabilizers relative to the main matrix and curing agent according to the required properties of the target soft resinous sheet article.

Flame retardants are added to exhibit desired flame retarding properties. Examples thereof are tetrabromobisphenol (TBA), decabromodiphenyl ether (DBDPE), tetrabromodiphenyl ether, hexabromobenzene, hexabromocyclodecane, tetrabromophthalic anhydride and other bromine-containing flame retardants; chlorinated polyethylenes, chlorinated paraffins, perchlorocyclopentadecane, tetrachlorophthalic anhydride and other chlorine-containing flame retardants; tricresyl diphosphate (TCP), triphenyl phosphate (TPP), cresyl diphenyl phosphate (CDP), trixylenyl phosphate, triethyl phosphate, xylenyl diphenyl phosphate, cresyl bis(di-2,6-xylenyl) phosphate, 2-ethylhexyl diphenyl phosphate, dimethyl methylphosphate, ammonium polyphosphate and other halogen-free phosphate compounds; tris(chloroethyl)phosphate, tris(chloropropyl)phosphate, tris(dichloropropyl)phosphate, tris(tribromoneopentyl)phosphate and other halogen-containing phosphate compounds; and antimony trioxide, zinc borate, zirconium compounds, expanded graphite and other inorganic flame retardants; potassium trichlorobenzenesulfonate, potassium perfluorobutanesulfonate, potassium diphenylsulfone-3-sulfonate and other metal salts of organic sulfonic acids, metal salts of aromatic sulfonimides, alkali metal salts of polystyrenesulfonic acid in which a metal salt of sulfonic acid, metal salt of sulfuric acid, metal salt of phosphoric acid or metal salt of boric acid is combined with the aromatic ring of styrenic polymers, polyphenylene ethers and other aromatic-group-containing polymers, and other metal salts flame retardants.

The present invention also relates to soft resinous sheet articles prepared by reacting and curing a matrix comprising the acrylic copolymer (A) or a mixture of the acrylic copolymer (A) and the aliphatic hydrocarbon compound (D) with the glycidyl-containing compound (B) as a curing agent preferably in the presence of the catalyst (E).

The sheet article of the present invention as a cured article of the composition has a hardness of preferably 70 or less and more preferably 50 or less at 25° C. as determined with an ASKER-C hardness tester. A sheet article having a hardness exceeding 70 may insufficiently flexible.

It is preferred that the acrylic copolymer (A) is prepared by bulk polymerization and is substantially free of solvent or medium.

In general, polymeric compounds having a polymerizable double bond, such as acrylic acid, methacrylic acid, styrene and derivatives of them, can be polymerized by solution polymerization (e.g., emulsion polymerization and suspension polymerization) or bulk polymerization. The resulting polymers are used in a variety of applications such as sheet articles, adhesives, paints, fibers and sealants.

Among these polymerization procedures, solution polymerization such as emulsion polymerization and suspension polymerization can easily control polymerization conditions and can relatively easily produce uniform target polymers with high efficiency, since components are reacted in a liquid such as a reaction solvent or disperse medium. According to the polymerization process performed in a liquid, however, a target polymer can be relatively easily separated from the other components if it is solidified as a result of the reaction, but the target polymer cannot be significantly separated from the liquid medium if it is a liquid, and when the polymer itself is required, the process requires fractional distillation, filtration, washing and other complicated procedures, and the other liquid components than the polymer are difficult to remove completely.

In contrast, bulk polymerization does not use such medium and can efficiently produce a highly pure polymer without problems in separation of liquids and in residual impurities. For (meth)acrylic polymers, however, the bulk polymerization has not sufficiently control the polymerization reaction and has not yielded a purified polymer having a uniform structure and molecular weight distribution.

However, these problems in the bulk polymerization are now solved by techniques such as the selection of a suitable catalyst or the use of a monomer serving also as an initiator. Thus, polymers having a relatively uniform molecular weight distribution can be efficiently obtained by the bulk polymerization (Japanese National Patent Publication No. Sho 59-6207, Japanese Patent Application Laid-open No. Sho 60-215007, Japanese Patent Application Laid-open No. Hei 10-17640, Japanese Patent Application Laid-open No. 2000-239308, Japanese Patent Application Laid-open No. 2000-128911 and Japanese Patent Application Laid-open No. 2001-40037).

The composition of the present invention is basically three or four components, i.e. the acrylic copolymer (A) having specific physical properties, the glycidyl-containing compound (curing agent) (B) having specific physical properties, the filler (C), and the aliphatic hydrocarbon compound (D), if any, replacing part of the acrylic copolymer (A) are mixed and stirred. In this procedure, it is preferred that the filler (C) has been previously mixed with at least one of the acrylic copolymer (A), the aliphatic hydrocarbon compound (D) and the glycidyl-containing compound (B) and all the components are then mixed. However, these components can be mixed at substantially one time. It is also acceptable that the filler (C) has been mixed with the glycidyl-containing compound (B) alone. The reaction is advantageously performed in the presence of the catalyst (E).

By weighing appropriate amounts of the components and mixing and stirring them, the filler (C) can be incorporated into the matrix comprising the acrylic copolymer (A) or the acrylic copolymer (A) and the aliphatic hydrocarbon compound (D). The mixing and stirring procedure is not specifically limited and is appropriately selected typically according to composition and viscosity of the polymer, as well as the type and amount of the filler (C). For example, a stirrer or agitator such as dissolver mixer or homo mixer can be used. The procedure of the filler (C) with the glycidyl-containing compound (B) can also be performed in a similar manner.

Where necessary, the resulting mixture may be filtered for removing aggregates of undispersed filler or other contaminations.

Bubbles or foams formed in the mixture upon mixing and stirring may be defoamed under vacuum.

The soft resinous sheet article of the present invention can be prepared typically by homogeneously mixing the filler (C) with the matrix comprising the acrylic copolymer (A) (or the mixture of the acrylic copolymer (A) and the aliphatic hydrocarbon compound (D)); immediately mixing and stirring the resulting mixture with the glycidyl-containing compound (curing agent) (B) preferably in the presence of the catalyst (E) to form a paste; and allowing the resin components in the paste to react and cure. If the reaction between the matrix and the curing agent proceeds slowly at ambient temperature, the paste may be heated to react and cure the resin components. The components can be mixed by stirring with the use of the aforementioned mixer and then defoamed, or be mixed by using a static mixer. The heating temperature may be set depending on the properties of the functional groups and is preferably from about 120° C. to about 180° C. The soft resinous article preferably prepared by applying the paste onto a film such as a separator film or paper such as a release paper.

As is described above, the sheet article prepared from the composition of the present invention is satisfactorily stable to heat, is sufficiently flexible when it has a hardness of 70 or less at 25° C. as determined with an ASKER-C hardness tester and can follow a non-flat plane such as curve. And the sheet is preferably used as thermal interface materials such as thermal conductive sheet, thermally conductive polymer; heat conductive sheet, heat dissipative sheet, heat transfer material; or electric insulation sheets.

The composition of the present invention can be satisfactorily defoamed, and the resulting sheet article is impervious to foams that adversely affect the sheet article by expanding at high temperatures or inducing cracking.

EXAMPLES

The present invention will be illustrated in further detail with reference to several examples and comparative examples below, which are not intended to limit the scope of the invention.

Examples 1 to 12 and Comparative Examples 1 to 5

An acrylic copolymer (A), a filler (C), an aliphatic hydrocarbon compound (D) and a catalyst (E) shown in Table 1 were mixed and stirred in proportions shown in Table 1, and the mixture was thoroughly defoamed. The defoamed mixture was mixed with an epoxy curing agent (B) in a proportion shown in Table 1 and was applied to a polyester film having a releasable surface.

After the application, the resulting article was heated in an oven at 180° C. for 7 minutes to cure the resin components. The article was then aged by leaving at ambient temperature for 24 hours and thereby yielded sheet-shaped sheet articles according to Examples 1 to 12.

Sheet-shaped sheet articles according to Comparative Examples 1 to 5 were prepared in proportions shown in Table 2 by the same procedure as above, except for using curing agent.

The properties of articles that were not cured under the aforementioned conditions were not determined.

The properties of the sheet-shaped articles were determined. The results of the sheets according to Examples 1 to 12 and those according to Comparative Examples 1 to 5 are shown in Tables 1 and 2.

Properties

1) Filler Content

The content (percent by volume) of the filer (C) was defined as the volume percent of the filler (C) to 100 of the total volume of the matrix [the components (A), (B) and (D)] and the filler (C).

2) Hardenability

Fifty grams (50 g) of a sample liquid composition was left in a thermostatic oven at 150° C. for 20 minutes, and the hardenability of the sample was determined according to the following criteria:

Good: the sample was cured
Fair: the sample became gel
Failure: the sample was not cured and remained liquid 3) Heat Resistance Fifty grams (50 g) of a sample liquid composition was left in a thermostatic oven at 150° C. for 20 minutes to form a cured article. The cured article was left in an oven at 130° C. for 500 hours, and then the hardness of the article was determined. The rate of change in hardness to the initial hardness before test was evaluated according to the following criteria:

Good: ±10 percent or less
Failure: exceeding ±10 percent

4) Foaming

Fifty grams (50 g) of a sample liquid composition was defoamed at a reduced pressure of 10 Torr for 20 minutes. The defoamed liquid sample was left in a thermostatic oven at 150° C. for 20 minutes to yield a cured article. The cross section of the cured article was visually observed, and foaming was evaluated according to the following criteria:

Good: no foam
Failure: foams

5) Deformation by High-Temperature Compression

A sample liquid composition was defoamed at a reduced pressure of 10 Torr for 20 minutes and was poured into a mold of 50 mm long, 50 mm wide and 20 mm deep, and the mold was left in a thermostatic oven at 150° C. for 30 minutes to form a cured article. The cured article was left in a thermostatic oven at 120° C. for 100 hours under the application of a load of 2 kg/cm$^2$ (50 kg/25 cm$^2$) in a thickness direction. The cured article was then cooled to room temperature, from which the load was removed, and the article was left for one day, followed by determination of deformation. The degree of deformation with respect to the initial dimensions was determined and indicated by percent from 100 percent (large deformation) to zero percent (small deformation).

6) Processability

Viscosity: The viscosity of a sample composition was determined at 25° C. at 1013 hPa using a Brookfield rotational viscometer Model BM.

Defoaming property: The presence or absence of foams formed in the defoaming procedure at a reduced pressure of 10 Torr for 20 minutes was determined by visual observation.

Good: No foam was observed. The sample was defoamed satisfactorily under reduced pressure.
Fair: Some foams were observed.
Failure: Foams were formed continuously. The sample was not satisfactorily defoamed under reduced pressure.

7) Bleedout

Fifty grams (50 g) of a sample liquid composition was left in a thermostatic oven at 150° C. for 20 minutes to form a cured article. The cured article was left in an oven at 120° C. for 100 hours, and the surface of the cured article was observed by touch to determine bleedout.

Good: no bleedout
Failure: bleedout

8) Hardness

The hardness of a cured article was measured at ordinary temperature (25° C.) using an ASKER C hardness tester. In the tables below, "ND" means that a sample liquid composition was not hardened or cured and the hardness could not be determined.

9) Flame Retardancy

The flame retardancy of a sample was determined according to UL-94 V (vertical burning test) specified in flame retardancy standards of Underwriters Laboratories, Inc. (UL).

TABLE 1-1

|   |   | Ex. 1 | Ex. 2 | Ex. 3 | Ex. 4 | Ex. 5 | Ex. 6 | EX. 7 |
|---|---|---|---|---|---|---|---|---|
| A | Acrylic Copolymer *1 | 100 | 95 |  | 50 | 50 | 50 | 100 |
|   | Acrylic Copolymer *2 |  |  | 100 | 50 | 50 | 45 |  |
|   | Acrylic Copolymer *3 |  |  |  |  |  |  |  |
|   | Acrylic Copolymer *4 |  |  |  |  |  |  |  |
| B | Epoxy Curing Agent *5 | 33.2 | 34.5 | 19.9 | 26.6 | 26.6 | 27.5 | 33.2 |
|   | Epoxy Curing Agent *6 |  |  |  |  |  |  |  |
| C | Filler *7 | 150 | 150 | 150 | 150 | 150 | 150 | 150 |
|   | Filler *8 |  |  |  |  |  |  |  |
|   | Filler *9 |  |  |  |  |  |  |  |
| D | Compound *10 |  | 5 |  |  |  | 5 |  |
|   | Compound *11 |  |  |  |  |  |  |  |
| E | Catalyst *12 | 1 | 1 | 1 | 1 |  |  | 1 |
|   | Catalyst *13 |  |  |  |  | 1 | 1 |  |
|   | Catalyst *14 |  |  |  |  |  |  |  |
| F | Polyphosphate ammonium |  |  |  |  |  |  | 40 |
|   | Exfoliated graphite |  |  |  |  |  |  |  |
| Filler content (% by volume) |  | 30 | 30 | 32 | 31 | 31 | 31 | 30 |
| Hardenability |  | Good | Good | Good | Good | Good | Good | Good |
| Heat resistance |  | Good | Good | Good | Good | Good | Good | Good |
| Foaming |  | Good | Good | Good | Good | Good | Good | Good |
| Deformation by high-temperature compression |  | 5 | 8 | 8 | 6 | 6 | 8 | 5 |
| Moldability | Viscosity | 30000 | 22000 | 60000 | 42000 | 42000 | 38000 | 32000 |
|   | Defoaming | Good | Good | Good | Good | Good | Good | Good |
| Bleedout |  | Good | Good | Good | Good | Good | Good | Good |
| Hardness |  | 35 | 28 | 30 | 35 | 37 | 38 | 35 |
| Frame retardancy |  |  |  |  |  |  |  | V-0 |

TABLE 1-2

|   |   | Ex. 7 | Ex. 8 | Ex. 9 | Ex. 10 | Ex. 11 | Ex. 12 | EX. 13 |
|---|---|---|---|---|---|---|---|---|
| A | Acrylic Copolymer *1 | 100 | 95 | 100 |  | 100 |  | 100 |
|   | Acrylic Copolymer *2 |  |  |  |  |  | 100 |  |
|   | Acrylic Copolymer *3 |  |  |  |  |  |  |  |
|   | Acrylic Copolymer *4 |  |  |  | 100 |  |  |  |
| B | Epoxy Curing Agent *5 | 33.2 | 34.5 | 33.2 | 6.6 | 33.2 | 19.9 | 33.2 |
|   | Epoxy Curing Agent *6 |  |  |  |  |  |  |  |
| C | Filler *7 |  |  |  | 150 | 150 | 100 | 150 |
|   | Filler *8 |  |  |  |  |  |  |  |
|   | Filler *9 | 150 | 150 | 150 |  |  |  |  |
| D | Compound *10 |  | 5 |  |  |  |  |  |
|   | Compound *11 |  |  |  |  | 5 |  |  |
| E | Catalyst *12 | 1 |  |  | 1 | 1 |  | 1 |
|   | Catalyst *13 |  | 1 | 1 |  |  |  |  |
|   | Catalyst *14 |  |  |  |  |  | 0.5 |  |
| F | Polyphosphate ammonium |  |  |  |  |  |  | 30 |
|   | Exfoliated graphite |  |  |  |  |  |  |  |
| Filler content (% by volume) |  | 32 | 32 | 32 | 34 | 30 | 24 | 30 |
| Hardenability |  | Good | Good | Good | Good | Good | Good | Good |
| Heat resistance |  | Good | Good | Good | Good | Good | Good | Good |
| Foaming |  | Good | Good | Good | Good | Good | Good | Good |
| Deformation by high-temperature compression |  | 4 | 4 | 4 | 35 | 12 | 38 | 5 |
| Moldability | Viscosity | 20000 | 18000 | 20000 | 18000 | 30000 | 45000 | 31000 |
|   | Defoaming | Good | Good | Good | Good | Good | Good | Good |
| Bleedout |  | Good | Good | Good | Good | Failure | Good | Good |
| Hardness |  | 37 | 30 | 38 | 28 | 40 | 29 | 35 |
| Frame retardancy |  |  |  |  |  |  |  | V-0 |

TABLE 2

|   |   | Com. Ex. 1 | Com. Ex. 2 | Com. Ex. 3 | Com. Ex. 4 | Com. Ex. 5 |
|---|---|---|---|---|---|---|
| A | Acrylic Copolymer *1 |  | 100 | 100 | 100 | 50 |
|   | Acrylic Copolymer *2 |  |  |  |  | 50 |
|   | Acrylic Copolymer *3 | 100 |  |  |  |  |
|   | Acrylic Copolymer *4 |  |  |  |  |  |

TABLE 2-continued

|   |   | Com. Ex. 1 | Com. Ex. 2 | Com. Ex. 3 | Com. Ex. 4 | Com. Ex. 5 |
|---|---|---|---|---|---|---|
| B | Epoxy Curing Agent *5 | 59.8 |  | 33.2 | 33.2 | 26.6 |
|   | Epoxy Curing Agent *6 |  | 7.1 |  |  |  |
| C | Filler *7 | 150 | 150 | 35 |  |  |
|   | Filler *8 |  |  |  | 150 |  |
|   | Filler *9 |  |  |  |  | 15 |
| D | Compound *10 |  |  |  |  |  |
|   | Compound *11 |  |  |  |  |  |
| E | Catalyst *12 | 1 | 1 | 1 | 1 | 1 |
|   | Catalyst *13 |  |  |  |  |  |
|   | Catalyst *14 |  |  |  |  |  |
| Filler content (% by volume) |  | 26 | 34 | 9 | 30 | 5 |
| Hardenability |  | Good | Fair | Good | Good | Good |
| Heat resistance |  | Good | Good | Failure | Good | Failure |
| Foaming |  | Good | Good | Good | Failure | Good |
| Deformation by high-temperature compression |  | 65 | 70 | 45 | 9 | 40 |
| Mold-ability | Viscosity | 9000 | 38000 | 18000 | 95000 | 20000 |
|   | Defoaming | Good | Good | Good | Failure | Good |
| Bleedout |  | Good | Failure | Good | Good | Good |
| Hardness |  | 90 | 30 | 20 | 80 | 22 |

Acrylic Copolymer *1: a carboxyl-containing acrylic copolymer containing butyl acrylate (BA) in its principal chain and having a weight-average molecular weight (Mw) of 3000, an acid value (AV) of 100, a glass transition temperature (Tg) of −54° C. and a viscosity of 7000 mPa·s
Acrylic Copolymer *2: a carboxyl-containing acrylic copolymer containing 2-ethylhexyl acrylate (2EHA) in its principal chain and having a weight-average molecular weight (Mw) of 5000, an acid value (AV) of 60, a glass transition temperature (Tg) of −55° C. and a viscosity of 9000 mPa·s
Acrylic Copolymer *3: a carboxyl-containing acrylic copolymer containing methyl acrylate (MA) in its principal chain and having a weight-average molecular weight (Mw) of 500, an acid value (AV) of 180, a glass transition temperature (Tg) of 8° C. and a viscosity of 2000 mPa·s
Acrylic Copolymer *4: a carboxyl-containing acrylic copolymer containing ethyl acrylate (EA) in its principal chain and having a weight-average molecular weight (Mw) of 3000, an acid value (AV) of 20, a glass transition temperature (Tg) of −25° C. and a viscosity of 4000 mPa·s
Epoxy Curing Agent *5: a bifunctional diglycidyl ether of bisphenol A (DGEBA) having a weight per epoxide (EPW) of 186
Epoxy Curing Agent *6: an alicyclic epoxy resin having a weight per epoxide (EPW) of 76
Filler *7: a powdery calcium carbonate (CaCO₃) NN-500 (trade name, a product of Nitto Funka Kogyo K.K.) having an average particle diameter of 4.4 μm
Filler *8: a powdery calcium carbonate (CaCO₃)Hakuenka CCR (trade name, a product of Shiraishi Kogyo K.K.) having an average particle diameter of 0.12 μm
Filler *9: a powdery aluminium tri-hydroxide (Al(OH)₃) HIGILITE H-32 (trade name, a product of Showa Denko K.K.) having an average particle diameter of 8 μm
Compound *10: a castor oil fatty acid CO-FA (trade name, a product of Itoh Oil Chemicals Co., Ltd.)
Compound *11: Diisononyl phthalate (DINP)
Catalyst *12: 1,2-dimethylimidazole (1,2DMZ) (a product of Shikoku Kasei Co., Ltd.)
Catalyst *13: 2-methyl-triethylenediamine (methyl-DABCO) (a product of Sankyo Air Products Co., Ltd.)
Catalyst *14: dibutyl-tin dilaurate (a product of Nitto Kasei Co., Ltd.)
Ammonium Polyphosphate *15: Terraju-C60(a product of Budenheim Iberica)
Expanded Graphite *16: SYZR-1003(a product of Sanyo trading Co., Ltd)

INDUSTRIAL APPLICABILITY

The compositions of the present invention can efficiently produce, by curing, soft resinous sheet articles which are so flexible as to have a hardness as determined with an ASKER-C hardness tester of 70 or less at 25° C. and are highly stable to heat. They can also contain a relatively large amount of filler having a low specific gravity and can yield light-weighed flame-retardant sheet articles.

The compositions are liquid at room temperature and can be easily cured or hardened by heating in a short time without a complicated control of the reaction, in contrast to a vulcanization process, and the resulting sheet articles are stable over a long period of time at relatively high temperatures.

The invention claimed is:

1. A resin composition comprising:
   a matrix; and
   a filler (C) comprising a metal hydroxide having an average particle diameter of 0.5 to 30 μm and showing a decomposition temperature of 250° C. or higher, present in an amount of 150 parts by weight or more per 100 parts by weight of the acrylic copolymer (A);
   the matrix comprising:
      an acrylic copolymer prepared by copolymerization of two or more different monomers and having a glass transition temperature (Tg) or −60° C. to −20° C. as determined by differential scanning calorimetry or a blend of two or more acrylic homopolymers or a blend of two or more acrylic homopolymers and acrylic copolymers or a blend of two or more acrylic copolymers, wherein the major constituent polymer of the acrylic copolymer has a glass transition temperature of −60° C. to −20° C. as determined by differential scanning calorimetry; and
      a compound (B) containing two or more glycidyl groups per molecule having a weight per epoxide (WPE) of 80 to 400.

2. The resin composition according to claim 1, further comprising an aliphatic hydrocarbon compound (D) containing at least one carboxyl group and at least one hydroxyl group as functional groups and having a molecular weight of 70 to 300 and a melting point of 70° C. or lower.

3. A heat-stable soft resinous sheet article comprising a cured resin composition of claim 1, the sheet article having a hardness of 70 or less at 25° C. as determined with an ASKER C hardness tester.

4. The resin composition according to claim 1, wherein the filler (C) is at least one of aluminium hydroxide and magnesium hydroxide.

5. The resin composition according to claim 1, further comprising at least one of a polyphosphate flame retardant and an expanded graphite flame retardant.

6. A heat-stable soft resinous sheet article comprising a cured resin composition of claim 2, the sheet article having a hardness of 70 or less at 25° C. as determined with an ASKER C hardness tester.

* * * * *